(12) United States Patent  
Gustafson et al.

(10) Patent No.: US 10,748,534 B2  
(45) Date of Patent: *Aug. 18, 2020

(54) PERSONALITY-BASED CHATBOT AND METHODS INCLUDING NON-TEXT INPUT

(71) Applicant: Mattersight Corporation, Chicago, IL (US)

(72) Inventors: David Gustafson, Lake Bluff, IL (US); Christopher Danson, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/845,441

(22) Filed: Dec. 18, 2017

(65) Prior Publication Data

US 2018/0108353 A1  Apr. 19, 2018

Related U.S. Application Data

(63) Continuation of application No. 15/187,521, filed on Jun. 20, 2016, now Pat. No. 9,847,084, which is a (Continued)

(51) Int. Cl.
*G10L 15/22* (2006.01)
*G10L 15/26* (2006.01)
(Continued)

(52) U.S. Cl.
CPC ............. *G10L 15/22* (2013.01); *G06F 3/167* (2013.01); *G06F 40/20* (2020.01); *G10L 13/043* (2013.01);
(Continued)

(58) Field of Classification Search
CPC ....... G10L 13/043; G10L 15/00; G10L 15/20; G10L 15/22; G10L 15/26; G10L 15/265;
(Continued)

(56) References Cited

U.S. PATENT DOCUMENTS 5,553,121 A   9/1996  Martin et al.
5,694,116 A  12/1997  Kojima
(Continued)

OTHER PUBLICATIONS

"SIRI Rising: The Inside story of Siri's Origins—And Why She could Overshadow the iPhone," http://www.huffingtonpost.com, Jan. 22, 2013.
(Continued)

*Primary Examiner* — Paras D Shah
(74) *Attorney, Agent, or Firm* — Haynes and Boone, LLP

(57) ABSTRACT

The methods, apparatus, and systems described herein assist a user with a request. The methods in part receive input from a user that includes a voice input, a gesture input, a text input, biometric information, or a combination thereof; retrieve or determine a personality type of the user based on the input; determine a distress level or an engagement level of the user; determine a set of outputs responsive to the received input; rank the outputs in the set based on the retrieved or determined personality type and the determined distress level or engagement level; deliver a ranked output to the input in a modality based on the retrieved or determined personality type and a type of device configured to deliver the ranked output to the user, wherein the device comprises a navigation system, a car, a robot, or a combination thereof; and weigh the ranked output for future interactions.

26 Claims, 3 Drawing Sheets

Related U.S. Application Data continuation of application No. 14/309,728, filed on Jun. 19, 2014, now Pat. No. 9,390,706.

(51) Int. Cl.

| | | |
|---|---|---|
| *G10L 13/04* | (2013.01) | |
| *G10L 25/51* | (2013.01) | |
| *G10L 25/63* | (2013.01) | |
| *G06F 40/20* | (2020.01) | |
| *G06F 3/16* | (2006.01) | |
| *G10L 15/19* | (2013.01) | |
| *G10L 15/30* | (2013.01) | |
| *G10L 15/08* | (2006.01) | |
| *G10L 25/66* | (2013.01) | |
| *H04M 3/493* | (2006.01) | |

(52) U.S. Cl.
CPC ............ *G10L 15/19* (2013.01); *G10L 15/265* (2013.01); *G10L 15/30* (2013.01); *G10L 25/51* (2013.01); *G10L 25/63* (2013.01); *H04M 3/493* (2013.01); *G10L 25/66* (2013.01); *G10L 2015/088* (2013.01)

(58) Field of Classification Search
CPC ......... G10L 25/00; G10L 25/48; G10L 25/54; G10L 25/63; G10L 25/66; G10L 2025/00; H04M 3/493; G06F 17/20; G06F 17/21; G06F 17/22; G06F 17/27; G06F 17/271; G06F 17/2785; G06F 17/2765; G06F 17/28; G06F 40/00; G06F 40/10; G06F 40/103; G06F 40/20; G06F 40/30; G06F 35/09
See application file for complete search history.

(56) References Cited

U.S. PATENT DOCUMENTS

| | | | |
|---|---|---|---|
| 6,480,826 | B2 | 11/2002 | Pertrushin |
| 6,622,119 | B1 | 9/2003 | Ramaswamy et al. |
| 6,622,140 | B1 | 9/2003 | Kantrowitz |
| 6,731,307 | B1 | 5/2004 | Strubbe et al. |
| 6,757,362 | B1 | 6/2004 | Cooper et al. |
| 6,795,808 | B1 | 9/2004 | Strubbe et al. |
| 7,184,540 | B2 | 2/2007 | Dezonno et al. |
| 7,216,080 | B2 | 5/2007 | Tsiao et al. |
| 7,266,499 | B2 | 9/2007 | Surace et al. |
| 7,340,393 | B2 | 3/2008 | Mitsuyoshi |
| 7,593,740 | B2 | 9/2009 | Crowley et al. |
| 7,627,475 | B2 | 12/2009 | Petrushin |
| 7,783,486 | B2 | 8/2010 | Rosser et al. |
| 7,805,223 | B2 | 9/2010 | Yamaguchi et al. |
| 7,810,033 | B2 | 10/2010 | Cordes et al. |
| 7,881,934 | B2 | 2/2011 | Endo et al. |
| 8,000,453 | B2 | 8/2011 | Cooper et al. |
| 8,131,551 | B1 | 3/2012 | Cosatto et al. |
| 8,150,692 | B2 | 4/2012 | Stewart et al. |
| 8,204,513 | B2 | 6/2012 | Crowley et al. |
| 8,239,189 | B2 | 8/2012 | Skubacz et al. |
| 8,285,549 | B2 | 10/2012 | Teegan et al. |
| 8,321,278 | B2 | 11/2012 | Haveliwala et al. |
| 8,407,055 | B2 | 3/2013 | Asano et al. |
| 8,538,755 | B2 | 9/2013 | Bollano et al. |
| 8,566,263 | B2 | 10/2013 | Flinn et al. |
| 8,660,849 | B2 | 2/2014 | Gruber et al. |
| 8,670,786 | B2 | 3/2014 | Crowley et al. |
| 8,670,979 | B2 | 3/2014 | Gruber et al. |
| 8,719,015 | B2 | 5/2014 | Jang et al. |
| 8,719,035 | B2 | 5/2014 | Stewart et al. |
| 8,731,942 | B2 | 5/2014 | Cheyer et al. |
| 8,799,000 | B2 | 8/2014 | Guzzoni et al. |
| 8,892,446 | B2 | 11/2014 | Cheyer et al. |
| 8,898,344 | B2 | 11/2014 | Frank et al. |
| 8,903,716 | B2 | 12/2014 | Chen et al. |
| 8,930,191 | B2 | 1/2015 | Gruber et al. |
| 8,996,314 | B2 | 3/2015 | Ohnemus et al. |
| 9,069,864 | B2 | 6/2015 | Liu |
| 9,117,447 | B2 | 8/2015 | Gruber et al. |
| 9,195,645 | B2 | 11/2015 | Grieves et al. |
| 9,380,013 | B1* | 6/2016 | Cashmore .......... G06Q 30/0263 |
| 9,390,706 | B2 | 7/2016 | Gustafson et al. |
| 2002/0029203 | A1 | 3/2002 | Pelland et al. |
| 2002/0133347 | A1 | 9/2002 | Schoneburg et al. |
| 2003/0028498 | A1 | 2/2003 | Hayes-Roth |
| 2003/0036899 | A1 | 2/2003 | Leslie et al. |
| 2004/0082839 | A1 | 4/2004 | Haugen |
| 2004/0101127 | A1 | 5/2004 | Dezonno et al. |
| 2004/0237759 | A1 | 12/2004 | Bill |
| 2006/0020473 | A1 | 1/2006 | Hiroe et al. |
| 2006/0122834 | A1 | 6/2006 | Bennett |
| 2006/0265090 | A1* | 11/2006 | Conway ............ H04M 3/42221 700/94 |
| 2007/0003914 | A1 | 1/2007 | Yang |
| 2008/0091406 | A1 | 4/2008 | Baldwin et al. |
| 2008/0096533 | A1 | 4/2008 | Manfredi et al. |
| 2008/0105482 | A1 | 5/2008 | Yamaguchi et al. |
| 2008/0154828 | A1* | 6/2008 | Antebi ................... G06N 5/022 706/46 |
| 2008/0240379 | A1 | 10/2008 | Maislos et al. |
| 2009/0006345 | A1* | 1/2009 | Platt ..................... G06F 40/274 |
| 2010/0123588 | A1* | 5/2010 | Cruz Hernandez ............ A61B 5/02438 340/573.1 |
| 2011/0087483 | A1 | 4/2011 | Hsieh et al. |
| 2011/0144999 | A1 | 6/2011 | Jang et al. |
| 2011/0283190 | A1 | 11/2011 | Poltorak |
| 2012/0016678 | A1 | 1/2012 | Gruber et al. |
| 2012/0209840 | A1 | 8/2012 | Gur |
| 2012/0245944 | A1 | 9/2012 | Gruber et al. |
| 2012/0259240 | A1 | 10/2012 | Llewellynn et al. |
| 2013/0031107 | A1 | 1/2013 | Pan et al. |
| 2013/0066819 | A1 | 3/2013 | Nice et al. |
| 2013/0110515 | A1 | 5/2013 | Guzzoni et al. |
| 2013/0117022 | A1 | 5/2013 | Chen et al. |
| 2013/0185074 | A1 | 7/2013 | Gruber et al. |
| 2013/0185078 | A1 | 7/2013 | Tzirkel-Hancock et al. |
| 2013/0311997 | A1 | 11/2013 | Gruber et al. |
| 2013/0325478 | A1 | 12/2013 | Matsumoto et al. |
| 2014/0046660 | A1 | 2/2014 | Kamdar |
| 2014/0059066 | A1 | 2/2014 | Koloskov |
| 2014/0090038 | A1 | 3/2014 | Liu |
| 2014/0229175 | A1 | 8/2014 | Fischer et al. |
| 2014/0280117 | A1 | 9/2014 | Bank et al. |
| 2015/0066479 | A1 | 3/2015 | Pasupalak et al. |
| 2015/0074197 | A1 | 3/2015 | Brown et al. |
| 2016/0062988 | A1 | 3/2016 | Allen et al. |
| 2016/0162477 | A1 | 6/2016 | Orsini et al. |
| 2016/0300570 | A1 | 10/2016 | Gustafson et al. |

OTHER PUBLICATIONS

Mark et al., "Cognitive Assistant that Learns and Organizes," http://pal.sri.com/; http://www.ai.sri.com/project/CALO, 2014.

* cited by examiner

PERSONALITY-BASED CHATBOT AND METHODS INCLUDING NON-TEXT INPUT

CROSS-REFERENCE TO RELATED APPLICATION

This application is a continuation of U.S. patent application Ser. No. 15/187,521, filed Jun. 20, 2016, now allowed, which is a continuation of U.S. patent application Ser. No. 14/309,728, filed Jun. 19, 2014, now U.S. Pat. No. 9,390,706, the entire contents of each of which is hereby incorporated herein by express reference thereto.

TECHNICAL FIELD

The present disclosure generally relates to methods, apparatus, and systems related to intelligent personal assistants, and more specifically to an intelligent personal assistant adapted to a personality type of the user.

BACKGROUND OF THE DISCLOSURE

Intelligent automated assistant systems that perform functions in response to user requests are common in many contexts. Such systems may be used, for example, in navigation systems, information requests, and customer service applications.

Intelligent personal assistant systems such as Siri® can accept simple human natural language input from a client device such as a smartphone, and do various tasks for the person using the device. For example, a user can communicate with Siri® by speaking natural language through Siri®'s intelligent voice interface, and ask what the current weather is, what the nearest restaurants are, etc. The user can also ask Siri® to launch other applications installed in the user's smartphone. Other intelligent assistant examples include CALO, and Google Now®, which focuses on information search assistant functionality.

Conventional intelligent automated assistant systems, such as Siri® and Google Now®, are somewhat generic with respect to users. That is, the personality of a user is typically not known to the system during the exchanges. Knowledge of, and ability to adapt to the personality, has now been discovered to provide for a more pleasant user experience (e.g., verbal, visual, and textual responses) according to the disclosure below.

SUMMARY

In one aspect, the present disclosure encompasses a system adapted to communicate with a user, which includes: a node including a processor and a non-transitory computer readable medium operably coupled thereto, the non-transitory computer readable medium including a plurality of instruction stored in association therewith that are accessible to, and executable by, the processor, where the plurality of instructions includes instructions that, when executed, receive a user voice communication from a client device; instructions that, when executed, convert the voice communication to text; instructions that, when executed, retrieve or determine a personality type of the user from three or more personality types based on one or more user communications; instructions that, when executed, determine a set of outputs based on the user communication; instruction that, when executed, rank outputs based on the user's personality; instructions that, when executed, engage with an external service to perform an action based on the communication; and instructions that, when executed, determine a distress level or engagement level of the user, or both, based on the ranked and selected output and the modality of delivery, and weighting the ranked and selected outputs for one or more future interactions with the user.

In another aspect, the present disclosure includes methods for communicating with a user that receive a user voice communication from a client device, convert the voice communication to text, retrieve or determine a personality type of the user from three or more personality types based on one or more user communications, determine a set of outputs based on the user communication, rank outputs based on the user's personality, engage with an external service to perform an action based on the communication, and determine a distress level or engagement level of the user, or both, based on the ranked and selected output and the modality of delivery, and weight the ranked and selected outputs for one or more future interactions with the user.

In yet another aspect, the disclosure includes methods for assisting a user, which methods include: receiving, by one or more processors, at least one input from the user, determining, by one or more processors, a personality type of the user based on the at least one input, determining, by one or more processors, a set of outputs based on the at least one input from the user, ranking, by one or more processors, the outputs based on the user's personality type, engaging, by one or more processors, with an external service to perform an action based on the at least one input from the user, and determining a distress level or engagement level of the user, or both, based on the determined and ranked outputs and the modality of delivery of the action, and weighting the determined and ranked outputs for one or more future interactions with the user.

In yet a further aspect, the disclosure includes non-transitory computer readable media including a plurality of instructions, which include: instructions that, when executed, receive input from a user, instructions that, when executed, identify a personality type of the user based on the input, instructions that, when executed, extract at least one attribute from the input; and instructions that, when executed, engage with an external service to perform an action based on the at least one attribute, and instructions that, when executed, determine a distress level or engagement level of the user, or both, based on the identified personality type and the at least one attribute and a modality of delivery of the action, and weight the identified personality type and the at least one attribute for one or more future interactions with the user.

Additionally in a second aspect, the present disclosure seeks to improve and enhance a user experience with an intelligent personal assistant by tailoring the output of the assistant to the user's personality or a complementary personality. The present methods may extract personality-related information from user input and use it to formulate an output that is responsive to the user input, where the output may preferably be in the form of verbal output, visual output, textual output, or a combination thereof.

In this aspect, the present disclosure relates to a system adapted to assist a user. The system includes a node that includes a processor and a non-transitory computer readable medium operably coupled thereto, and the non-transitory computer readable medium includes a plurality of instructions stored in association therewith that are accessible to, and executable by, the processor. The plurality of instructions include instructions that, when executed, receive user input; instructions that, when executed, retrieve or determine personality type of the user; and instructions that, when executed, deliver output to the user based on the personality type.

In a further aspect, the present disclosure relates a method for assisting a user. The method includes receiving, by one or more processors, at least one input from the user; entering, by the one or more processors, the at least one input into an algorithm trained to output a personality type of the user; and tailoring, by the one or more processors, an output based on the personality type.

In another aspect, the present disclosure relates to a non-transitory computer readable medium that includes a plurality of instructions. The plurality of instructions include instructions that, when executed, receive input from a user; instructions that, when executed, identify a personality type of the user based on the input; instructions that, when executed, extract at least one attribute from the input; and instructions that, when executed, formulate an output responsive to the input and the personality type.

In yet another aspect, the present disclosure relates to a system adapted to assist a user. The system includes a storage device storing a non-transitory computer readable program; and a processor executing the non-transitory computer readable program. The processor includes a communication module adapted to receive a user input; a scoring module adapted to use the user input to determine a personality type of the user; and an interaction module adapted to provide an output to the user based on the input and the personality type of the user.

The disclose also encompasses various additional embodiments. In a third aspect, the disclosure encompasses a system adapted to communicate with a user, which includes a node including a processor and a non-transitory computer readable medium operably coupled thereto, the non-transitory computer readable medium including a plurality of instruction stored in association therewith that are accessible to, and executable by, the processor, where the plurality of instructions includes: instructions that, when executed, receive input from a user, wherein the input includes: a voice input, a gesture input, a text input, biometric information, or a combination thereof; instructions that, when executed, retrieve or determine a personality type of the user based on the input from the user; instructions that, when executed, determine a distress level or an engagement level of the user; instructions that, when executed, determine a set of outputs responsive to the received input; instructions that, when executed, rank the outputs in the set based on the retrieved or determined personality type of the user and the determined distress level or engagement level of the user; instructions that, when executed, deliver a ranked output to the input in a modality based on the retrieved or determined personality type of the user and a type of device configured to deliver the ranked output to the user, wherein the device includes a navigation system, a car, a robot, or a combination thereof; and instructions that, when executed, weigh the ranked output for future interactions with the user.

In a fourth aspect, the disclosure encompasses a method for communicating with a user, which includes receiving input from a client device, wherein the input include a voice input, a gesture input, a text input, biometric information, or a combination thereof, retrieving or determining a personality type of the user from three or more personality types based on input from the user, determining a distress level of the user, an engagement level of the user, or both, determining a set of outputs responsive to the received input, ranking outputs based on the retrieved or determined personality type of the user and the determined distress level of the user, the engagement level of the user, or both, delivering a ranked output to the input in a modality based on the retrieved or determined personality type of the user and a type of device configured to deliver the ranked output to the user, wherein the device includes a navigation system, a self-driving car, a robot, or a combination thereof, and weighing the ranked output for future interactions with the user.

In a fifth aspect, the disclosure encompasses a method for assisting a user, which includes receiving, by one or more processors, at least one input from the user, wherein the at least one input include a voice input, a gesture input, a text input, biometric information, or a combination thereof, determining, by one or more processors, a personality type of the user from three or more personality types based on the at least one input, determining a distress level of the user or an engagement level of the user, determining, by one or more processors, a set of outputs based on the at least one input from the user and the determined personality type of the user, ranking, by one or more processors, the outputs based on the determined personality type of the user and the determined distress level or engagement level of the user, delivering, by one or more processors, a ranked output to the input in a modality based on the determined personality type of the user and a type of device configured to deliver the ranked output to the user, wherein the device includes a navigation system, a self-driving car, a robot, or a combination thereof, and weighing the ranked output for future interactions with the user.

In a sixth aspect, the disclosure encompasses a non-transitory computer readable medium including a plurality of instructions that, when executed, receive input from a client device of a user, wherein the input include a voice input, a gesture input, a text input, biometric information, or a combination thereof, and the client device includes a wearable computer health monitoring device; instructions that, when executed, identify a personality type of the user based on the input; instructions that, when executed, determine a distress level or an engagement level of the user; instructions that, when executed, determine a set of outputs responsive to the received input; instructions that, when executed, rank the outputs in the set based on the identified personality type of the user and the determined distress level or engagement level of the user; instructions that, when executed, deliver a ranked output to the input in a modality based on the identified personality type of the user and a type of device configured to deliver the ranked output to the user, wherein the device includes a navigation system, a self-driving car, a robot, or a combination thereof; and instructions that, when executed, weigh the ranked output for future interactions with the user.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
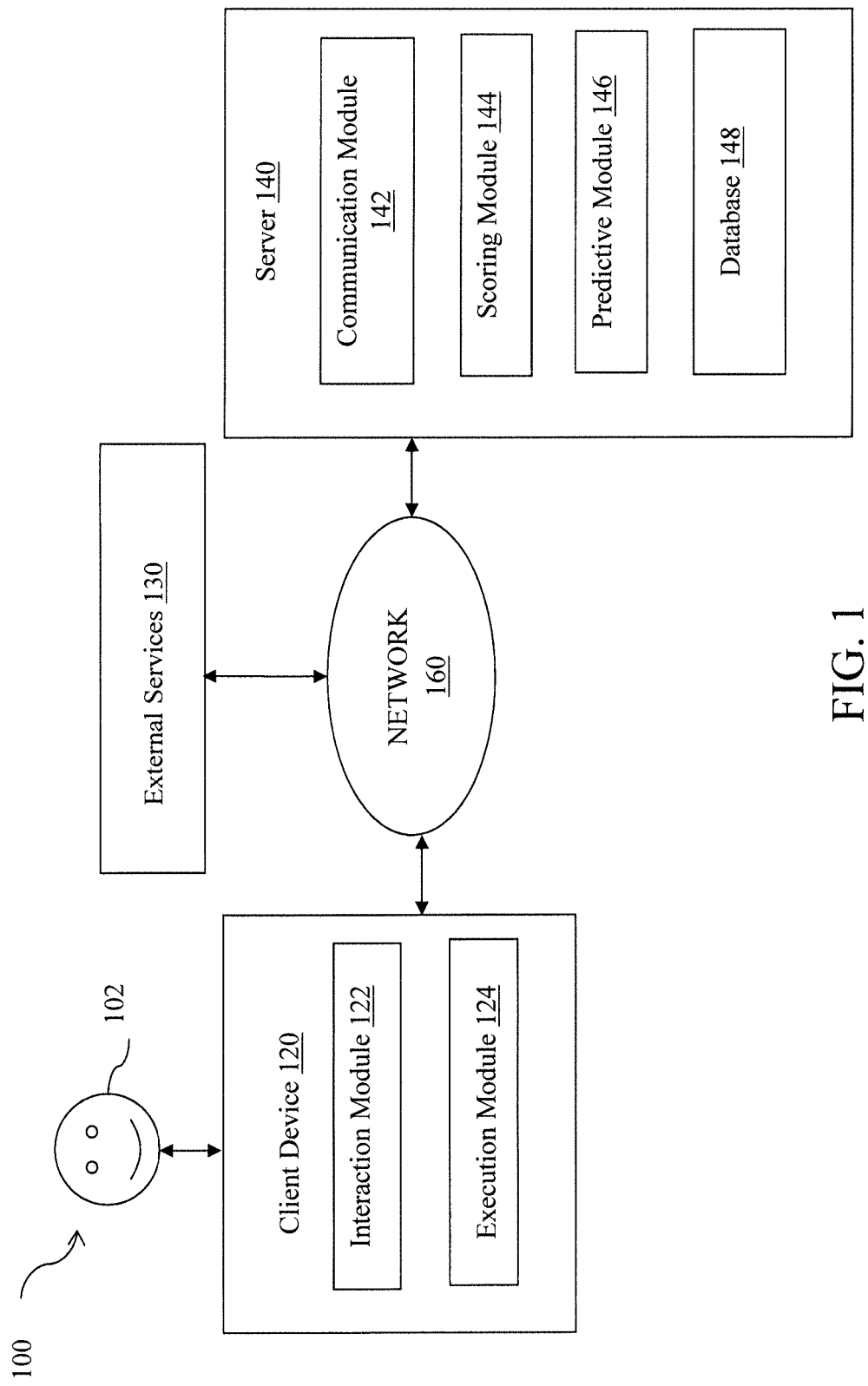
FIG. 1 is a simplified block diagram of an embodiment of an intelligent personal assistant system according to various aspects of the present disclosure.

The present disclosure advantageously relates to a method and apparatus for tailoring the output of an intelligent personal assistant to a user's personality or a complementary personality. Embodiments of the disclosure determine a user's personality type so that the system's "personality" can be adjusted to be more pleasing to the user. This includes adjusting not just the manner in which the output is formulated and presented to the user, but also the timing of the output in some cases. In a preferred embodiment, the output may be adjusted in terms of verbal output, visual output, textual output, timing, or a combination thereof. The adjustments can be applied to all users, to a single user, or to specific classes of users. In some embodiments, the intelligent personal assistant system is used by a plurality of users, and the knowledge learned from individual users can be used to provide better output to other users.

The intelligent assistant described herein can take in human requests or commands in any suitable format, although preferably in a simple text format, especially in natural language format, and perform one or more tasks for a user based on the input and personality type of the user. The intelligent assistant learns the personality type of the user through such input and one or more personality-determining algorithms, and uses the personality type to carry out one or more tasks for the user. The personality type is used by the intelligent assistant to improve the information and more accurately execute requests that the assistant provides in response to queries, and also to predict what the user may want in the future. In various embodiments, the personality of the user is either pre-determined through previous input, determined upon receiving each input to help ensure the same user is operating the intelligent assistant, or is updated over time with additional input, or a combination thereof.

The methods include receiving user input, determining personality type of the user, and delivering output to the user based on the personality type. In various embodiments, the personality type of the user is based on the received input. In other embodiments, the personality type is determined in part based on received input and in part based on an algorithm developed to determine personality based on user input, either by the same user or a group of users, or both.

Systems and apparatuses for carrying out these methods are also part of the present disclosure. An exemplary system to assist a user includes, for example, a node including a processor and a computer readable medium operably coupled thereto, the computer readable medium including a plurality of instructions stored in association therewith that are accessible to, and executable by, the processor, where the plurality of instructions includes instructions that, when executed, receive at least one input from a user, determine personality type of the user, and provide an output based on the personality type and the user input.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 depicts a schematic block diagram of an intelligent personal assistant system 100 in accordance with one or more embodiments of the present disclosure. The system 100 is implemented on a distributed computing network, such as one having any number of clients and/or servers. In various embodiments, functionality for implementing the methods of the present disclosure can be distributed among any number of client and/or server components. For example, various software modules can be implemented for performing various functions in connection with the present disclosure, and such modules can be variously implemented to run on one or more server and/or client components. In one embodiment, the system 100 may be implemented on an interactive voice response (IVR) system or on a website. For example, a company's IVR or website could determine the personality of the user through real-time analysis or retrieval of data from a database, and either adapt to the personality of the user or use the user's personality to filter or modify the output, or both.

FIG. 1 depicts one possible arrangement by which software modules can be distributed among a client and server. One of ordinary skill in the art will readily recognize that the depicted arrangement is merely exemplary, and that such modules can be distributed in many different ways. The modules can be distributed among the client and/or server in any of a number of different ways.

The system 100 includes a client device 120, external services 130, and server 140 in communication over a network 160. Although only one client device is shown in FIG. 1, it should be understood that multiple client devices 120 may be in communication with the server 140, either concurrently or sequentially, or both. As shown in FIG. 1, the server 140 includes communication module 142, scoring module 144, predictive module 146, and database 148. In one or more embodiments, the server 140 is configured as a networked system (e.g., an Internet web-based system accessible by any client device worldwide) for providing information to client device 120. In various examples, client device 120 may be implemented by any system suitable for communication, such as a desktop computer, a laptop computer, a tablet, a cellular telephone, a smartphone, a personal digital assistant, a navigation device, a gaming device, a set top box, or the like. Alternatively, the client device 120 may be incorporated in a commercial interactive dialogue system, such as dialogue systems that are used for customer service applications.

The network 160, in one embodiment, may be implemented as a single network or a combination of multiple networks. For example, in various embodiments, the network 160 may include the Internet and/or one or more intranets, extranets, landline networks, wireless networks, and/or other appropriate types of communication networks. In another example, the network 160 may comprise a wireless telecommunications network (e.g., cellular phone network) adapted to communicate with other communication networks, such as the Internet. Any suitable network available to connect the client device 120 and server 140 may be used.

The client device 120, in various embodiments, may be implemented using any appropriate combination of hardware and/or software configured for wired and/or wireless communication over the network 160. The client device 120, in one embodiment, may be utilized by a user 102 to communicate with the server 140 over the network 160.

The client device 120, in one embodiment, includes an interaction module 122 to conduct transactions with the server 140 over the network 160. In one implementation, the interaction module 122 comprises a software program, such as a graphical user interface (GUI), executable by a processor that is configured to interface and communicate with the server 140 via the network 160.

The interaction module 122 interacts with a user 102, accepting a user's requests for an operation via the client device 120 and providing answers or results to the user 102. In some embodiments, interaction module 122 may include an intelligent user interface module to support intelligent, simplified communication with the user 102 via human language input. The intelligent user interface module enables the user 102 to present requests in human language or gesture on what the user 102 wants to perform via the client device 120. The user 102 can give the task request in simple text form (or forms that can be translated to simple text form), wherein the task request may contain a simple description of the operation to be performed by the client device 120. In some embodiments, the intelligent user interface module can accept the user 102 request in any simple non-text gesture (including, without limitation, voice input). Combinations of text and non-text can be used, as well.

The interaction module 122 receives and processes user inputs from the user 102 to formulate a "correct" output (e.g., response to a user request) that best approximates the results the user 102 seeks to obtain. In one embodiment, the user inputs are deliberately entered by the user 102. The inputs received from the user 102 include primary data that is entered by the user 102, such as requests for assistance (e.g., requests for directions to a specific location, requests for information, directions to open an app, etc.). In one embodiment, the inputs received from the user 102 also include the user's feedback with respect to previous outputs, which may include repeated inputs attempting to achieve a more accurate output. In addition, the input(s) may include stored user data, such as a user profile.

Examples of different user inputs include, but are not limited to: voice input, text input, demographic information, transaction information, biometric information, location information, time information, sensor information, clicking and menu selection, and events, and any combination thereof. Voice input can be received from mobile devices such as mobile telephones and tablets, computers with microphones, Bluetooth headsets, automobile voice control systems, over the telephone system, recordings on answering services, audio voicemail on integrated messaging services, and consumer applications with voice input such as clock radios, telephone station, home entertainment control systems, and game consoles. Text input can be received from keyboards on computers or mobile devices, keypads on remote controls or other consumer electronics devices, email messages, instant messages or similar short messages, text received from players in multiuser game environments, text in searches and other web interactions, and text streamed in message feeds. Demographic information, such as gender, age, ethnicity, employment status, marital status, etc., can be input by the user. Transaction information includes data from shopping, banking, or travel, and may be provided by the user, or accessed from a database. Biometric information can be received from a wearable computer health monitoring device. Location information can come from sensors or other location-based systems, such as a Global Positioning System (GPS) on mobile phones. Time information can be received from clocks on client devices or externally from the devices. Compass, accelerometer, gyroscope, and/or travel velocity data, and other sensor information can be received from mobile or handheld devices. Clicking and menu selection and other events from a GUI or touches to a touch screen can also be received. Events from sensors and other data-driven triggers, such as alarm clocks, location triggers, calendar alerts, price change triggers, and the like can also be received. Exemplary sensor input includes, without limitation, information from a user swiping or touching an interactive display at one or more points or times, rotating or lifting a device, rolling a device, pivoting a device, eye-tracking, or any combination thereof. In other embodiments, inputs can include information from other devices, including radio frequency identification (RFID) tags, web-enabled devices, Bluetooth enabled devices, and other devices connected with other communication protocols.

The execution module 124 serves or executes the user 102 requests. In one embodiment, the execution module 124 converts voice input to text and then performs searches based on the key words or command words in the input. In some embodiments, the execution module 124 may include a resolver module that is responsible for finding solutions and serving or executing the user 102 requests. When a user request is accepted by interface module 122, it can be delivered to such a resolver module for analysis, interpretation, and searching for potential answers and solutions to fulfill the user 102 request. If some answer is found, it can be given back to the user 102. If there is some task that needs to be executed and the method of how to execute is found, the resolver module will perform the task for the user, possibly by engaging with some other internal modules (e.g., a database module), and/or some external services 130. The execution module 124, or any included resolver module that is a part thereof, may also use a plurality of existing solutions or answers to serve the user 102 request.

In some embodiments, execution module 124 delivers the result or status of the task execution to the user 102 at any time convenient for the user 102. At that time, execution module 124 may give the user 102 the option to verify the correctness of the execution, or dismiss the result as incorrect or incomplete if undesirable. The feedback from the user 102 can be used later to further refine the output provided to user 102.

The execution module 124 selects the output based on the inputs received by the interaction module 122 and the information parsed from the inputs. The execution module 124 communicates, in various embodiments, with the server 140 to determine the appropriate output based on the user inputs. The execution module 124, in one embodiment, also determines which modality to provide the output to the user 102. For example, the output can be provided visually (e.g., graphic output) or by sound (e.g., voice output). The output selection bases this determination at least in part on the personality of the user 102. That is, the user 102 personality is one of the inputs or parameters to guide selection of the appropriate output modality.

Examples of different types of output include, but are not limited to, text output, text and graphics output, speech output, a graphical layout with photos, text, videos, sounds, and hyperlinks, actuator output to control physical actions on a device, invoking other applications on a device, and actuator output to control physical actions to devices attached or controlled by a device. Actuator output to control physical actions on a device can include causing it to turn on or off, make a sound, change color, vibrate, control a light, activate or deactivate a transmitter/receiver (e.g., WiFi, GPS or Bluetooth), modify volume control, or the like, or any combination thereof. Invoking other applications on a device can include calling a mapping application, voice dialing a telephone, sending an email, playing media, making entries in calendars, and the like. Actuator output to control physical actions of devices attached or controlled by a device can include operating a remote camera, controlling a wheelchair, playing music on remote speakers, playing videos on remote displays, and the like.

In various embodiments, the client device 120 can call external services 130 that interface with functionality and applications on the device 120 via an application program interface (API) or other means, to perform functions and operations that might otherwise be initiated using a conventional user interface on the device 120. Such functions and operations may include, for example, setting an alarm, making a telephone call, sending a text or email message, adding a calendar event, and the like. In one embodiment, the server 140 can call external services 130 when needed to obtain additional information, such as stored data concerning previous interactions with particular users. Communications with external services 130 can take place via network 160.

The server 140, in one embodiment, may be maintained by a service provider, which may provide further processing of user inputs and outputs. As such, the server 140 includes a communication module 142, a scoring module 144, a predictive module 146, and a database 148. The server 140 identifies the personality type of the user 102 and tailors the output received by the user 102 based on the user 102 personality.

The communication module 142 is adapted to receive a user input from the interaction module 122 of the client device 120. In one embodiment, the received user input is in a non-text format (e.g., voice input) and the non-text input is converted to text before further processing.

The scoring module 144 is adapted to apply one or more linguistic algorithms to user input (e.g., text and voice input) and output a personality type. In some embodiments, this can be considered a Tier II analysis. In various aspects, the personality type is transmitted to the execution module 124. A linguistic algorithm(s) is typically created by linguistic analysts and such algorithm(s) are typically trained using previously analyzed user inputs. In one embodiment, the analyst(s) can review inputs and manually label keywords or terms that are relevant to an identified personality type. The algorithm is trained to check for those keywords and the number of times they are used in the inputs. A more sophisticated algorithm may be used that additionally checks for use of the keywords in context. One master algorithm containing many specific algorithms may also be used. In one embodiment, an algorithm that includes verbal cues related to personality can be used, or used in addition to a textual analysis, to determine, e.g., that sudden spikes in a user's verbal input may be stress or anger, or that less variation in tone might mean a user is unhappy.

In one embodiment, the linguistic algorithm(s) leverage statistical and linguistic approaches and aim to take into account the many dimensions of the user 102, including, but not limited to engagement, distress, mental state, and personality type. The term "engagement" is meant herein to refer to the level of interest or commitment the user 102 expresses in the input. A user who is engaged in the subject matter of the input often shows excitement or enthusiasm in their speech and words. The term "distress" is meant herein to refer to dissatisfaction, anxiety, sorrow, anger, or a combination thereof. A user who is distressed about the input will use words expressing sadness, anger, or disappointment. The term "mental state" refers to the state of mind or mood of the user 102. For example, the user 102 state of mind may be frustrated, depressed, or happy. Finally, by "personality type" is meant herein, for example, Thoughts, Opinions, Reactions, and Emotions, although these may vary in type and number depending on the personality model selected.

In some embodiments, the user inputs are subjected to a linguistic-based psychological behavioral model to assess the personality type of the user 102. For example, such a behavioral model may be applied to a transcription of the user input. In one embodiment, the inputs are mined for behavioral signifiers associated with a linguistic-based psychological behavioral model. In particular, the scoring module 144 searches for and identifies text-based keywords (i.e., behavioral signifiers) relevant to a predetermined psychological behavioral model.

It is well known that certain psychological behavioral models have been developed as tools, and any such behavioral model available to those of ordinary skill in the art will be suitable for use in connection with the disclosure. These models are used to attempt to evaluate and understand how and/or why one person or a group of people interacts with another person or group of people. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications, might include, for example: Thoughts, Opinions, Reactions, Emotions. These models generally presuppose that all people fall primarily into one of the enumerated basic personality types. In some cases, the models categorize each person as one of these four types (or some other number of personality types), all people have parts of each of the types within them. Each of the types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations.

In various embodiments, the scoring module 144 determines or extracts communication attributes from the input (e.g., voice input and/or text input) using, for example, a linguistic algorithm. Such communication attributes include one or more of tone, tempo, pattern of speech, syntax, and grammar, and provide the scoring module 144 with more information regarding the user 102. Tone refers to the accent or inflection expressive of a mood or emotion. Tempo refers to the speed or pace at which a person speaks. Pattern of speech refers to a distinctive manner of oral expression. Syntax refers to the arrangement of words and phrases. Grammar refers to the set of rules that explain how words are used in a language. These attributes indicate the communication style of the user 102. In one embodiment, the communication style of the output received by the user 102 is adapted to be similar to the communication style of the user 102. In another embodiment, the communication style of the output is adapted to be the best style for the personality of the user 102.

The predictive module 146 is adapted to use the various inputs received from the user 102 to determine what the user 102 may request in the future. For example, the inputs received may include a calendar appointment for a performance at the theater, transaction history indicating what seats were purchased at the theater, and location information of the user 102. The predictive module 146 predicts that the user 102 is planning to visit the theater at a specific time and provides the user 102 with directions to the theater and directions to the specific seats in the theater, without the user 102 specifically requesting directions.

Database 148 stores information and data related to the user 102 and interactions between the client device 120 and the user 102. Such information includes recent information, such as history of recent dialog between the client device 120 and the user 102, including history of user inputs, history of recent selections by the user 102, such as which items were opened or explored, a list of recent user requests, and device sensor data (such as location, time, positional orientation, motion, light level, sound level, and the like). The information can also include less recent information, such as personal information and data about the user 102 (e.g., preferences, identities, accounts, addresses, and the like), information that the user 102 has collected (e.g., bookmarks, favorites, etc.), lists of saved business entities (e.g., restaurants, hotels, stores, theaters, and other venues), the user 102 personal calendar, to-do list, contact databases, reminders and alerts, and social network lists, shopping lists and wish lists, coupons and discount codes, and history and receipts for transactions including reservations, purchases, and tickets to events.

Figure 2:
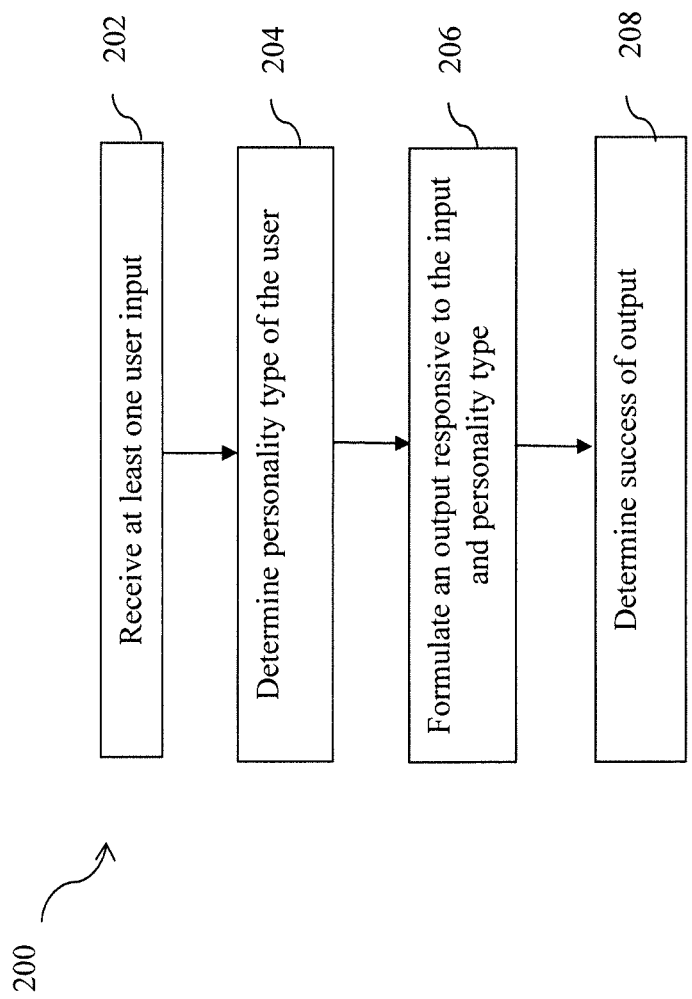
FIG. 2 is a flowchart illustrating a preferred method of assisting a user according to aspects of the present disclosure.

An exemplary method 200 of assisting a user will now be described with respect to FIG. 2. At step 202, at least one input from the user 102 is received by the interaction module 122. As described above, the input may be a voice input, a gesture input, or a text input, or a combination thereof. In various embodiments, the input includes a request for information. In one embodiment, the input includes current context information, such as current user location and local time.

In an embodiment, the interaction module 122 transmits the input to the communication module 142. In various embodiments, the input may be transmitted along with a user identifier, which can be used by the server 140 to access stored information regarding the user 102. The execution module 142, in one embodiment, may convert the input into a text format before the input is provided to the communication module 142.

At step 204, the communication module 142 transmits the input to the scoring module 144, and the scoring module 144 determines the personality type of the user 102. In one embodiment, the scoring module 144 predicts the personality type of the user 102 based on previous transactions between the user 102 and the client device 120, including past purchase history, past calling history, past responses, etc. In other embodiments, the scoring module 144 retrieves a pre-existing user profile of the user 102 to determine personality type. The user profile may be stored, for example, in database 148. In yet another embodiment, the input is analyzed and run through a linguistic algorithm to determine personality type of the user 102. The algorithm, for example, looks for specific terms, keywords and phrases (i.e., groups of keywords) that indicate a specific personality type and the density of those terms in the input.

In various embodiments, these terms, phrases, or keywords are stored in a library or libraries that are accessed by the scoring module 144. The library may separate the keywords, terms, and phrases into different personality types. Keywords are the words previously determined to indicate the specific characteristic in the input. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Also, due to the flexibility of the methods described herein, additional words, terms, and/or phrases may be added to the library at any time, such as based on additional input, external analysis of terminology, or both. For example, when it becomes apparent that another word is used frequently and is just as effective as the associated keyword, the library may be updated to include this word as an acceptable alias. In other embodiments, contextual weighting based on keywords used in context with certain related words may be used, to help determine personality type when a keyword is used by multiple personality types.

The scoring module 144, in one embodiment, uses one or more linguistic algorithms that are configured to detect keywords, terms, and phrases in the input related to personality type, and the input is scored based on the number of word hits (i.e., based on keywords, terms, phrases, etc.). The score assigned to the input is the personality type of the user 102. For example, reactions-type personalities use emotional words, opinions-types use opinion words, emotions-types use reflection words, and reactions-types use reaction words.

In one embodiment, the personality type of the user 102 is updated over time. The scoring module 144 analyzes and evaluates the most recent inputs from the user 102 to determine the personality type of the user 102. The updating allows the personality exhibited by the client device 120 to adapt to the user's 102 personality type, based on what the client device 120 learns about the user 102 and the interactions between the client device 120 and the user 102. Accordingly, in a relationship with the client device 120, the personality exhibited by the client device 120 is chosen to best match or complement the personality of the user 102. In an embodiment, the personality type exhibited matches the personality type of the user 102 to better achieve success with the output results.

In some embodiments, the scoring module 142 further extracts other data attributes disclosed from the input, such as (without limitation) one or more of distress level, life events, engagement, state of mind, distress, purpose of contact/task, demographic data (race, age, education, accent, income, nationality, ethnicity, area code, zip code, marital status, job status, credit score, gender), or a combination thereof. In various embodiments, these other data attributes are combined with the personality type of the user 102 to determine the best response or output to provide the user 102. In one embodiment, these attributes are continually updated based on the inputs received so that a real-time response is provided.

At step 206, the scoring module 144 and the execution module 124 formulate an output responsive to the input and personality type of the user 102. For example, assume user 102 does not say or write anything, and the inputs received include an elevated heart rate (as transmitted by a heart rate monitor, Fitbit® or a similar device) and a vehicle speed that exceeds the speed limit (as transmitted by a vehicle GPS interface), the scoring module 142 can draw conclusions on the user's 102 mental state. The user 102 could be determined to be in a hurry, feeling rushed, or feeling distressed. Based on all this information and the personality type of the user 102 (e.g., emotions type), the scoring module 142 can, e.g., direct the execution module 124 to suggest faster or less crowded routes and to play soothing, calming music.

In some embodiments, the predictive module 146 predicts what the user 102 may want in the future and provides output based on the prediction. For example, the predictive module 146 may incorporate various inputs, such as calendar entries, emails, prior searches, information requests, and biometric data and predict what the user 102 will need or request.

The system 100 uses the personality of the user 102 to improve the information the system 100 provides in response to the input. For example, the interaction module 122 uses words associated with the user's 102 personality type, and selects the best combination of communication attributes (e.g., tone, tempo, syntax, grammar, etc.) to communicate a response or output to the user 102. In one embodiment, the output uses words associated with the user's 102 identified personality type that is predicted to have the most productive interaction with the user 102. The output response, both in terms of phrasing, tempo, and other communication attributes, as well as the substantive response itself, can be modified based on the personality-type of the user 102 coupled with the user input.

In various embodiments, the scoring module 144 and execution module 124 match the personality type of the user 102 with the best available personality for the system 100. The personality of the system 100 can include, for example, Thoughts, Opinions, Reactions, or Emotions. The selected personality exhibited by the client device 120 results in the most productive interaction with the user 102. For example, if the user 102 has a thoughts-based personality, the best personality may be determined to also be a thoughts-based personality.

In some embodiments, the various types of output are ranked based on the personality type of the user 102. There may be many different ways to respond to a user input. For example, a user input may be "remind me to leave for my meeting across town at 2 p.m." The output can be: (1) set alarm clock, (2) create a calendar event; or (3) call a to-do manager. The outputs can be ordered according to the personality of the user 102 so that the first ranked output is provided to the user 102 first.

At step 208, the interaction module 122 determines the success of the output. In an embodiment, the interaction module 122 evaluates the user 102 responses to the proposed outputs and uses that feedback to refine future outputs. For example, the interaction module 122 can determine if the user 102 takes a suggested action. A suggested action can include calling the suggested number, clicking on the suggested webpage, emailing the suggested contact, etc. In another embodiment, the interaction module 122 determines if the output results in a decrease in the user's 102 distress or an increase in the user's 102 engagement. In various embodiments, the scoring module 144 weights that selected personality response for future interactions. In one embodiment, the success data is continually updated with the kind of information that user 102 actually finds useful. In this way, the longer the user 102 interacts with the client device 120, the more personalized the client device 120 becomes. In one embodiment, the system and methods can adjust should two users 102 with different personality types share a client device 120, in that detection of the different personality can adjust to provide output results more suited to the particular user at that time.

Advantageously, the system 100 avoids becoming too similar to a human in a way that causes the human user 102 discomfort. The discomfort of the user 102 to an intelligent agent that is "too human, yet not human" can result in distress, which the system 100 can detect. The system 100 then adjusts future responses to reduce the distress. In the long run, this may result in the system 100 being useful, but less human-sounding or -acting over time.

In an exemplary embodiment, linguistic functions such as distress and engagement can help determine how to rank requests or inputs and prediction events for the user 102. For example, a request or input associated with a higher degree of distress would be prioritized over a request or input with a lesser degree of distress. This linguistic function, paired with the aggregation of success data, can help the system 100 specifically tailor priorities for the user 102.

Figure 3:
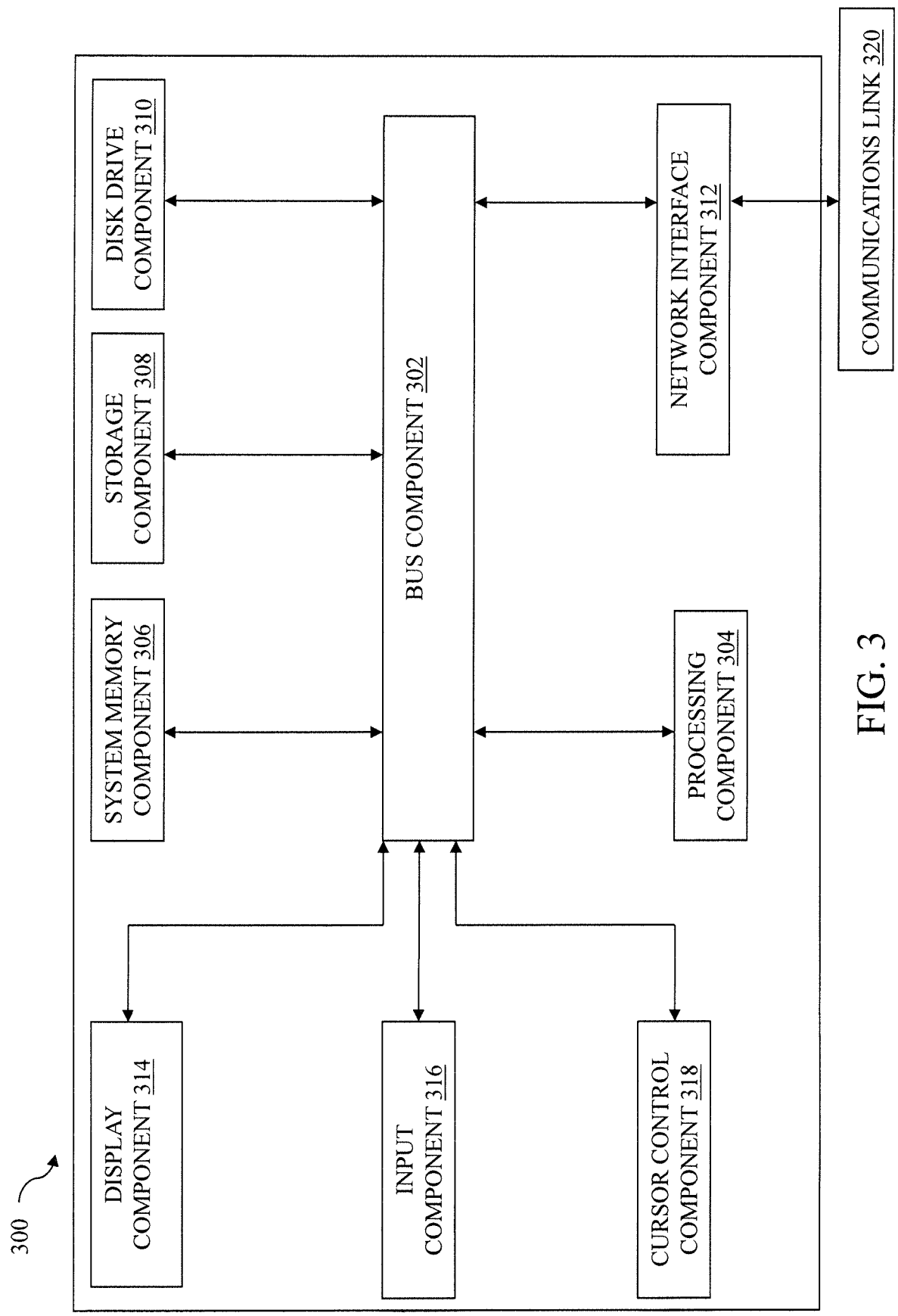
FIG. 3 is a block diagram of a computer system suitable for implementing one or more components in FIG. 1 according to one embodiment of the present disclosure.

Referring now to FIG. 3, illustrated is a block diagram of a system 300 suitable for implementing embodiments of the present disclosure, including client device 120 and server 140 depicted in FIG. 1. System 300, such as part a computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard, microphone), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. These may include any instructions disclosed herein, including to determine a user personality type, provide output based on the personality type, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for assisting a user.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow a quick determination of the nature of the technical disclosure. It is submitted with the understanding that it will not be used to interpret or limit the scope or meaning of the claims.

What is claimed is:

1. A system adapted to communicate with a user, which comprises:
   a node comprising a processor and a non-transitory computer readable medium operably coupled thereto, the non-transitory computer readable medium comprising a plurality of instructions stored in association therewith that are accessible to, and executable by, the processor, where the plurality of instructions comprises:
   instructions that, when executed, receive input from a user, wherein the input comprises:
   a voice input, a gesture input, a text input, biometric information, or a combination thereof;
   instructions that, when executed, apply a linguistic-based psychological behavioral model to the received input to determine a personality type of the user;
   instructions that, when executed, determine a set of outputs based on the linguistic-based psychological behavioral model responsive to the received input, wherein the outputs comprise a suggested phone number for the user to call, a suggested webpage for the user to click, or a suggested contact for the user to email;
   instructions that, when executed, rank the outputs in the set based on the determined personality type of the user;
   instructions that, when executed, deliver a ranked output to the input in a modality based on the determined personality type of the user;
   instructions that, when executed, determine that the ranked output is a success;
   instructions that, when executed, aggregate determined successes based on repeated user input;
   instructions that, when executed, determine a distress level or an engagement level of the user; and
   instructions that, when executed, prioritize future ranked outputs for the user based on the determined distress level or engagement level of the user and the aggregated determined successes.

2. The system of claim 1, wherein the plurality of instructions further comprise instructions, that when executed, determine a mental state of the user based on the received input.

3. The system of claim 1, wherein the input further comprises context information.

4. The system of claim 3, wherein the context information comprises a user location, a local time, a positional orientation, a motion, a light level, a sound level, or a combination thereof.

5. The system of claim 3, wherein the plurality of instructions further comprise instructions, that when executed, predict input based on the context information.

6. The system of claim 5, wherein the plurality of instructions further comprise instructions that, when executed, rank the predicted input to prioritize predicted inputs for the user.

7. The system of claim 1, wherein the instructions that determine that the ranked output is a success comprise instructions, that when executed, determine whether the ranked output results in a decrease in the distress level of the user or an increase in the engagement level of the user.

8. The system of claim 7, wherein the plurality of instructions further comprise instructions, that when executed, store the evaluation of the success of the ranked output and update the stored evaluation with outputs that result in a decrease in the distress level of the user or an increase in the engagement level of the user.

9. The system of claim 1, wherein the plurality of instructions further comprise instructions, that when executed, determine that the received input comprises input from a group of users.

10. The system of claim 9, wherein the plurality of instructions further comprise instructions, that when executed, adjust the outputs based on a determination of which of the group of users is providing the received input.

11. The system of claim 1, wherein the linguistic-based psychological behavioral model identifies behavioral signifiers.

12. The system of claim 1, wherein the linguistic-based psychological behavioral model determines personality types selected from a thoughts-type personality, an opinions-type personality, a reactions-type personality, or an emotions-type personality.

13. The system of claim 12, wherein the personality type of the user is the reactions-type personality and the linguistic-based psychological behavioral model identifies emotional words.

14. The system of claim 1, wherein the psychological behavioral model identifies specific terms, keywords, or phrases that indicate a specific personality type.

15. The system of claim 1, wherein the personality type of the user determines a distress level or an engagement level of the user.

16. A method for communicating with a user, which comprises:
    receiving input from a client device, wherein the input comprise a voice input, a gesture input, a text input, biometric information, or a combination thereof;
    applying a linguistic-based psychological behavioral model to the received input to determine a personality type of the user from three or more personality types;
    determining a set of outputs based on the linguistic-based psychological behavioral model responsive to the received input, wherein the outputs comprise a suggested phone number for the user to call, a suggested webpage for the user to click, or a suggested contact for the user to email;
    ranking outputs based on the determined personality type of the user;
    delivering a ranked output to the input in a modality based on the determined personality type of the user;
    determining that the ranked output is a success;
    aggregating determined successes based on repeated user input;
    determining a distress level or an engagement level of a user; and
    prioritizing future ranked outputs based on the determined distress level or engagement level of the user and the aggregated determined successes.

17. The method of claim 16, which further comprises determining a mental state of the user based on the received input.

18. The method of claim 16, wherein the input further comprises context information.

19. The method of claim 18, wherein the context information comprises a user location, a local time, a positional orientation, a motion, a light level, a sound level, or a combination thereof.

20. The method of claim 18, which further comprises predicting input based on the context information.

21. The method of claim 20, which further comprises ranking the predicted input to prioritize predicted inputs for the user.

22. The method of claim 16, which further comprises extracting one or more communication attributes from the input.

23. The method of claim 22, wherein each communication attribute is selected to comprise tone, tempo, pattern of speech, syntax, grammar, or any combination thereof.

24. A method for assisting a user, which comprises:
    receiving, by one or more processors, at least one input from the user, wherein the at least one input comprise a voice input, a gesture input, a text input, biometric information, or a combination thereof;
    applying, by one or more processors, a linguistic-based psychological behavioral model to the received input to determine a personality type of the user from three or more personality types;
    determining, by one or more processors, a set of outputs based on the linguistic-based psychological behavioral model, the at least one input from the user and the determined personality type of the user, wherein the outputs comprise a suggested phone number for the user to call, a suggested webpage for the user to click, or a suggested contact for the user to email;
    ranking, by one or more processors, the outputs based on the determined personality type of the user;
    delivering, by one or more processors, a ranked output to the input in a modality based on the determined personality type of the user;
    determining, by one or more processors, that the ranked output is a success;
    aggregating, by one or more processors, determined successes based on repeated user input;
    determining a distress level or an engagement level of the user; and
    prioritizing future ranked outputs for the user based on the determined distress level or engagement level and the aggregated determined successes.

25. The method of claim 24, wherein the at least one input further comprises a user location, a local time, a positional orientation, a motion, a light level, a sound level, or a combination thereof.

26. A non-transitory computer readable medium comprising a plurality of instructions comprising:
    instructions that, when executed, receive input from a client device of a user, wherein the input comprise a voice input, a gesture input, a text input, biometric information, or a combination thereof, and the client device comprises a wearable computer health monitoring device;
    instructions that, when executed, apply a linguistic-based psychological behavioral model to the received input to identify a personality type of the user;
    instructions that, when executed, determine a set of outputs based on the linguistic-based psychological behavioral model responsive to the received input, wherein the outputs comprise a suggested phone number for the user to call, a suggested webpage for the user to click, or a suggested contact for the user to email;

instructions that, when executed, rank the outputs in the set based on the identified personality type of the user;
instructions that, when executed, deliver a ranked output to the input in a modality based on the identified personality type of the user;
instructions that, when executed, determine that the ranked output is a success;
instructions that, when executed, aggregate determined successes based on repeated user input;
instructions that, when executed, determine a distress level or an engagement level of the user; and
instructions that, when executed, prioritize future ranked outputs for the user based on the determined distress level or engagement level of the user and the aggregated determined successes.

* * * * *